US008830856B2

(12) United States Patent
Hwang

(10) Patent No.: US 8,830,856 B2
(45) Date of Patent: Sep. 9, 2014

(54) METHOD FOR DETERMINING AN INSTANCE FOR PERFORMING A CHANNEL STATE INFORMATION MEASUREMENT AND COMMUNICATIONS APPARATUSES UTILIZING THE SAME

(75) Inventor: Chien-Hwa Hwang, Zhubei (TW)

(73) Assignee: Mediatek Inc., Hsin-Chu (TW)

( * ) Notice: Subject to any disclaimer, the term of this patent is extended or adjusted under 35 U.S.C. 154(b) by 157 days.

(21) Appl. No.: 13/346,838

(22) Filed: Jan. 10, 2012

(65) Prior Publication Data

US 2012/0176925 A1 Jul. 12, 2012

Related U.S. Application Data

(60) Provisional application No. 61/431,310, filed on Jan. 10, 2011.

(51) Int. Cl.
*H04L 1/00* (2006.01)
*H04L 12/26* (2006.01)
*H04W 4/00* (2009.01)

(52) U.S. Cl.
USPC ............ 370/252; 370/254; 370/264; 370/332

(58) Field of Classification Search
USPC .................................. 370/252, 254, 264, 332
See application file for complete search history.

(56) References Cited

U.S. PATENT DOCUMENTS

| 2004/0075606 | A1 | 4/2004 | Laiho et al. |
| 2010/0041390 | A1 | 2/2010 | Chen et al. |
| 2010/0220682 | A1 | 9/2010 | Tao et al. |
| 2010/0265901 | A1 | 10/2010 | Koo et al. |
| 2012/0113843 | A1 | 5/2012 | Watfa et al. |

FOREIGN PATENT DOCUMENTS

| CN | 101784116 | 7/2010 |
| EP | 1 761 097 | 3/2007 |
| WO | WO 2009/119988 | 10/2009 |
| WO | WO 2009118707 A1 * | 10/2009 |
| WO | WO 2010052566 A2 * | 5/2010 |

OTHER PUBLICATIONS

English language translation of abstract of CN 101784116 (published Jul. 21, 2010).
3GPP R1-106551; "LS on CSI Measurements on Restricted Subframes for eICIC;" 3GPP TSG-RAN WG1#63.20 Nov. 2010; pp. 1-2.

(Continued)

*Primary Examiner* — Xavier Szewai Wong
*Assistant Examiner* — Natali N Pascual Peguero
(74) *Attorney, Agent, or Firm* — McClure, Qualey & Rodack, LLP

(57) ABSTRACT

A communications apparatus is provided. A processor is coupled to a transceiver, and at least comprises a first processor logic unit for performing a channel state information measurement at the sub-frame(s) comprised in a first sub-frame subset configured by a peer communications apparatus to obtain a first measurement result, a second processor logic unit for performing a second channel state information measurement at the sub-frame(s) comprised in a second sub-frame subset configured by the peer communications apparatus to obtain a second measurement result, a third processor logic unit for reporting the first measurement result and the second measurement result to the peer communications apparatus via the transceiver at one or more reporting instances. The reporting instances are determined based on a plurality of reporting parameters, and the reporting parameters are respectively configured for the first sub-frame subset and second sub-frame subset by the peer communications apparatus.

25 Claims, 6 Drawing Sheets

(56) References Cited

OTHER PUBLICATIONS

3GPP R1-104547; "Time Shifting and Almost Blank Subframe for Intercell Interference Coordination;" 3GPP TSG-RAN WG1#62.18 Aug. 2010; pp. 1-8.

3GPP R1-103573; "eICIC of PCFICH and PDCCH in MeNB Plus HeNBs Deployment;" 3GPP TSG-RAN WG1#61 bis.Jun. 22, 2010; pp. 1-4.

3GPP R1-102307; Interference Coordination for Non-CA-Based Heterogeneous Networks; 3GPP TSG RAN WG1 Meeting#61 bis. Apr. 7, 2010; pp. 1-11.

Patent Cooperation Treaty Search Report and Written Opinion dated Apr. 19, 2012.

"Discussion on CRS Interference and CSI Measurements in Macro-Pico Deployment" 3GPP TSG RAN WG1 Meeting #63; Nov. 2010; pp. 1-4.

* cited by examiner

METHOD FOR DETERMINING AN INSTANCE FOR PERFORMING A CHANNEL STATE INFORMATION MEASUREMENT AND COMMUNICATIONS APPARATUSES UTILIZING THE SAME

CROSS REFERENCE TO RELATED APPLICATIONS

This application claims the benefit of U.S. Provisional Application No. 61/431,310 filed 2011 Jan. 10 and entitled "CSI Feedback based on Interference Measurement in Restricted Subsets of Subframes". The entire contents of which are hereby incorporated by reference.

BACKGROUND OF THE INVENTION

1. Field of the Invention

The invention relates to channel state information (CSI) measurement feedback based on interference measurement in restricted subsets of sub-frames in a wireless communications system.

2. Description of the Related Art

Due to mobile communication technology advancements in recent years, various communications services, such as voice call services, data transfer services, and video call services, etc., may be provided to users regardless of their locations. Most mobile communications systems are multiple access systems in which access and wireless network resources are allocated to multiple users. The multiple access technologies employed by the mobile communications systems include the 1x Code Division Multiple Access 2000 (1x CDMA 2000) technology, the 1x Evolution-Data Optimized (1x EVDO) technology, the Orthogonal Frequency Division Multiplexing (OFDM) technology, and the Long Term Evolution (LTE) technology. Evolved from the LTE technology, the LTE Advanced technology is a major enhancement of the LTE standard. The LTE Advanced technology should be compatible with LTE equipment, and should share frequency bands with the LTE communications system. One of the important LTE Advanced technology benefits is its ability to take advantage of advanced topology networks, wherein optimized heterogeneous networks have a mix of macros with low power nodes such as picocells, femtocells and new relay nodes.

FIG. 1 shows an exemplary heterogeneous network (HetNet) deployment. Within the coverage area 100 of a macro evolved node B (eNB) 101, several low power nodes having smaller coverage areas are deployed so as to improve the overall system capacity. As shown in the figure, a pico eNB (also called a picocell) 102, a femto eNB (also called a femtocell) 103 and a relay eNB 104 are deployed with the coverage area 100 of the macro eNB 101. However, such HetNet deployment may cause undesired inter-cell interference. For example, suppose that the user equipment (UE) 202, in the cell range expansion (CRE) region (such as the CRE region 205 shown in FIG. 1) of the pico eNB 102, camps on the pico eNB 102 as a serving cell. Because the power level of the signal received from the pico eNB 102 in the CRE region may be weaker than the power level of the signal received from the macro eNB 101, the signal transmitted by the macro eNB 101 adjacent to the UE 202 may become a strong interference, which interferes with the UE 202. For another example, when a UE 201 not belonging to the closed subscriber group (CSG) of the femto eNB 103 moves to the coverage area of the femto eNB 103, the signal transmitted by the femto eNB 103 may also become a strong interference, which interferes with the UE 201. For yet another example, the signal transmitted by the macro eNB 101 may also be an interference, which interferes with the UE 203 when the relay eNB 104 is transmitting a signal or data to the UE 203 at the same time.

The inter-cell interference may cause an inaccuracy problem when the UE is performing a channel state information (CSI) measurement in the wireless communications system. In order to solve the above-mentioned problems, methods and apparatuses for configuring channel state information (CSI) measurement and reporting CSI measurement results in a communications system are provided.

BRIEF SUMMARY OF THE INVENTION

Communications apparatuses and methods for configuring channel state information measurement and determining an instance for performing a channel state information measurement in a communications system are provided. An embodiment of a communications apparatus comprises a processor, coupled to a transceiver. The processor at least comprises a first processor logic unit for performing a channel state information measurement at the sub-frame(s) comprised in a first sub-frame subset configured by a peer communications apparatus to obtain a first measurement result, a second processor logic unit for performing a second channel state information measurement at the sub-frame(s) comprised in a second sub-frame subset configured by the peer communications apparatus to obtain a second measurement result, a third processor logic unit for reporting the first measurement result and the second measurement result to the peer communications apparatus via the transceiver at one or more reporting instances. The reporting instances are determined based on a plurality of reporting parameters, and the reporting parameters are respectively configured for the first sub-frame subset and second sub-frame subset by the peer communications apparatus.

An embodiment of a method for configuring channel state information measurement in a communications system comprises: determining at least a first sub-frame subset and a second sub-frame subset for a peer communications apparatus to perform channel state information measurement; respectively determining a plurality of reporting parameters comprising at least a reporting periodicity and a reporting offset for the first sub-frame subset and the second sub-frame subset; and transmitting one or more configuration messages carrying information regarding the first sub-frame subset, the second sub-frame subset, and the reporting parameters for the first sub-frame subset and the reporting parameters for the second sub-frame subset to the peer communications apparatus.

Another embodiment of a communications apparatus comprises a processor, coupled to a transceiver. The processor at least comprises a first processor logic unit for obtaining information regarding at least a first sub-frame subset, a second sub-frame subset and a plurality of reporting parameters configured by a peer communications apparatus, wherein the first and second sub-frame subsets are configured for performing a channel state information measurement via the transceiver and the reporting parameters correspond to at least the first sub-frame subset, a second processor logic unit for determining at least one reporting instance according to the reporting parameters for reporting a measurement result linked to the first sub-frame subset, and a third processor logic unit for determining a measuring instance for measuring the power of a desired signal corresponding to the first sub-frame subset based on the reporting instance, wherein the measuring instance is a valid downlink sub-frame belonging to the first sub-frame subset.

Another embodiment of a method for determining a measuring instance for performing a channel state information measurement in a communications system comprises: obtaining information regarding at least a first sub-frame subset, a second sub-frame subset and a plurality of reporting parameters configured by a peer communications apparatus, wherein the first and second sub-frame subsets are configured for performing a channel state information measurement and the reporting parameters correspond to at least the first sub-frame subset; determining at least one reporting instance according to the reporting parameters for reporting a measurement result linked to the first sub-frame subset; and determining a measuring instance for measuring the power of a desired signal corresponding to the first sub-frame subset based on the reporting instance, wherein the measuring instance is a valid downlink sub-frame belonging to the first sub-frame subset.

Another embodiment of a communications apparatus comprises a processor, coupled to a transceiver. The processor at least comprises a first processor logic unit for obtaining information regarding at least a first sub-frame subset and a second sub-frame subset configured by a peer communications apparatus, wherein the first and second sub-frame subsets are configured for performing a channel state information measurement via the transceiver, a second processor logic unit for determining a reporting instance for reporting a measurement result in response to a triggering message received from the peer communications apparatus for triggering a measurement report, a third processor logic unit for determining a sub-frame subset to be measured from the first and second sub-frame subsets according to a predetermined rule when the triggering message is unable to be linked to any of the first sub-frame subset and the second sub-frame subset or when the triggering message links to both of the first sub-frame subset and the second sub-frame subset, and a fourth processor logic unit for determining a measuring instance for measuring the power of a desired signal corresponding to the determined sub-frame subset, wherein the measuring instance is a valid downlink sub-frame belonging to the determined sub-frame subset.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
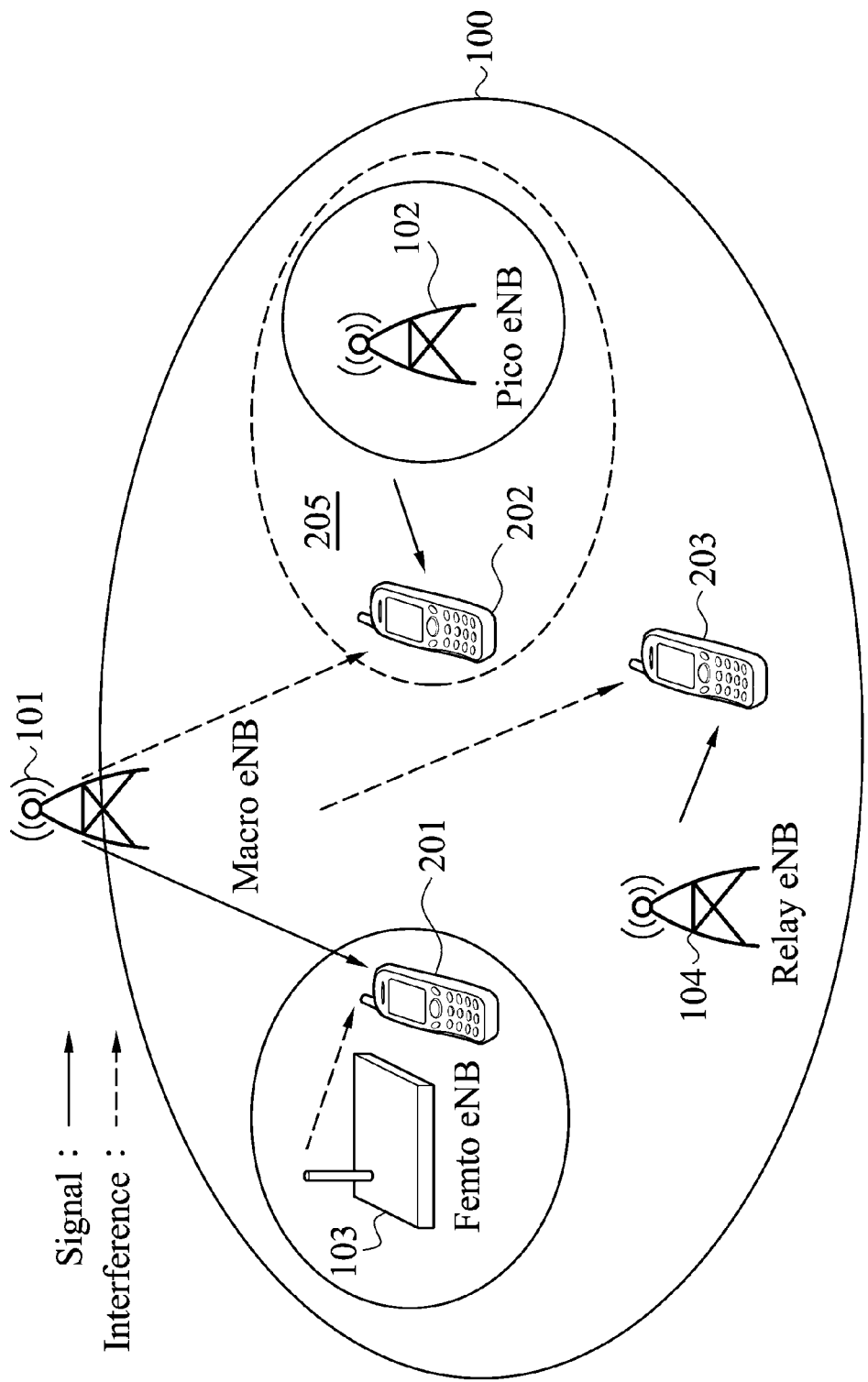
FIG. 1 shows an exemplary heterogeneous network (HetNet) deployment.
Figure 2:
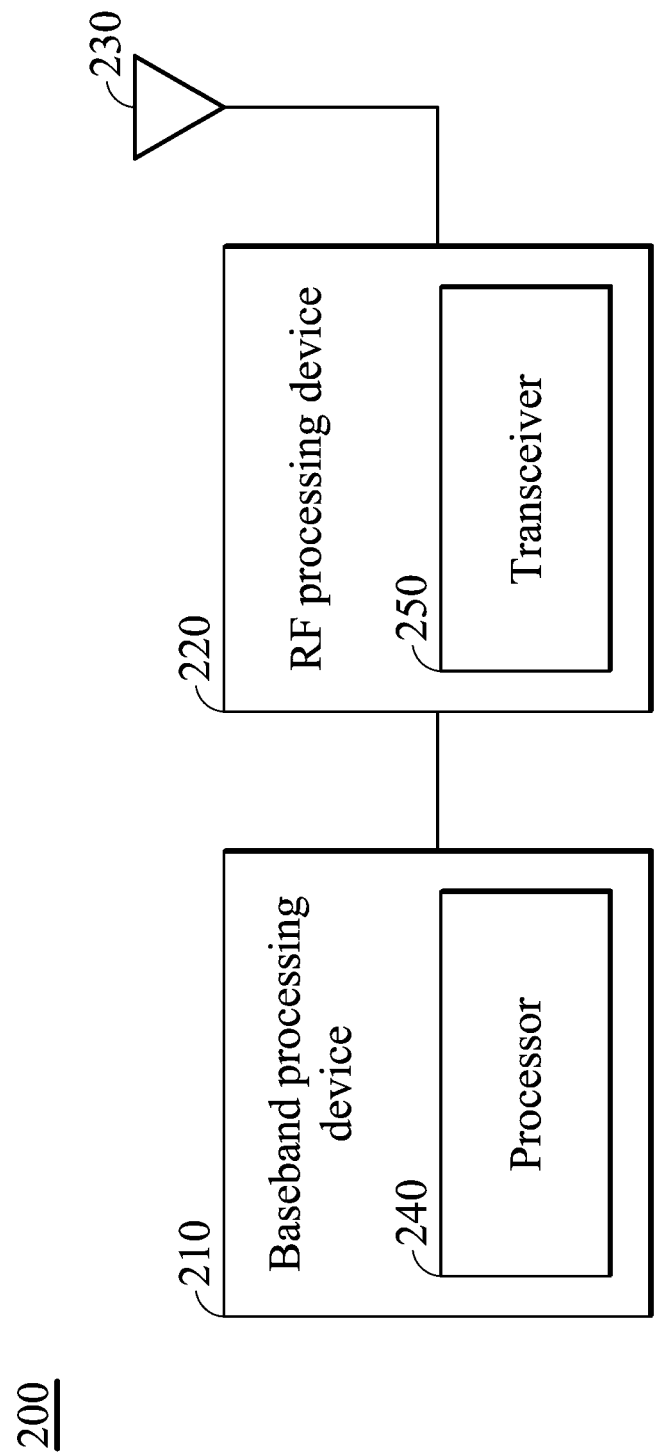
FIG. 2 is a simplified block diagram illustrating a communications apparatus according to an embodiment of the invention.

FIG. 2 is a simplified block diagram illustrating a communications apparatus according to an embodiment of the invention. The communications apparatus 200 may be a User Equipment (UE) in the service network as shown in FIG. 1. The operations of the service network may be in compliance with a communication protocol. In one embodiment, the service network may be a Long Term Evolution (LTE) system or an LTE Advanced system. The communications apparatus 200 may comprise at least a baseband processing device 210, a radio frequency (RF) processing device 220 and at least an antenna 230. The baseband processing device 210 may comprise multiple hardware devices to perform baseband signal processing, including Analog to Digital Conversion (ADC)/Digital to Analog Conversion (DAC), gain adjusting, modulation/demodulation, encoding/decoding, and so on. For example, the baseband processing device 210 may comprise a processor 240 for performing baseband signal processing. The processor 240 may further control the operation of the baseband processing device 210 and RF processing device 220 and other functional components, such as a display unit and/or keypad serving as the MMI (man-machine interface), a storage unit storing data and program codes of applications or communication protocols, or others.

The RF processing device 220 may receive RF wireless signals, convert the received RF wireless signals to baseband signals, which are processed by the baseband processing device 210, or receive baseband signals from the baseband processing device 210 and convert the received baseband signals to RF wireless signals, which are later transmitted. The RF processing device 220 may also comprise multiple hardware devices to perform signal transceiving and radio frequency conversion. For example, the RF processing device 220 may comprise a transceiver 250 for transceiving RF wireless signals and a mixer (not shown) to multiply the baseband signals with a carrier oscillated in the radio frequency of the wireless communications system, wherein the radio frequency may be 900 MHz, 1900 MHz, or 2100 MHz utilized in Universal Mobile Telecommunications System (UMTS) systems, or may be 900 MHz, 2100 MHz, or 2.6 GHz utilized in the LTE systems, or others depending on the radio access technology (RAT) in use. Note that in addition to the UMTS system and the LTE system, it is to be understood that the invention may be applied to any future RAT.

As previously described, the inter-cell interference may cause an inaccuracy problem when the UE is performing a channel state information (CSI) measurement in the wireless communications system. Therefore, in the preferred embodiments of the invention, the channel state information (CSI) measurement is preferably to be performed in restricted sub-frames, especially for victim UEs. Here, a victim UE refers to a UE suffering from inference from an adjacent eNB, such as the UE 202 in the CRE region 205 under the Macro-Pico deployment or the UE 201 suffering inference from an adjacent femto eNB 103 under the Macro-Femto deployment as shown in FIG. 1, or the likes.

According to an embodiment of the invention, the restricted sub-frames may refer to almost blank sub-frames (ABS). Generally, one frame may comprise 10 sub-frames, and one sub-frame has a duration of 1 ms and comprises 14 OFDM symbols. The sub-frame blanked by the eNB (which may be an eNB causing interference to the victim UE) is called an almost blank sub-frame (ABS). In the ABS, the eNB may not schedule data transmission, and only schedule fewer control signal transmissions than in a normal sub-frame. Because data transmission is not scheduled in the ABS, the control signals to be transmitted in the ABS can be fewer than that transmitted in a normal sub-frame. For example, in the ABS, the Physical Control Format Indicator Channel (PCFICH) control signals and Physical Downlink Control Channel (PDCCH) control signals are not transmitted, where the PCFICH control signal is utilized to specify how many OFDM symbols are used to transmit the control channels so that the receiver UE knows where to find control information, and the PDCCH control signal is utilized to specify resource allocation and modulation and coding scheme of the data signals (to be transmitted in the data region). The control signals that are still transmitted in the control region of an ABS may comprise, for example and are not limited to, the common control signals (such as the Common Reference Signal (CRS), synchronization signal, system information . . . . etc.) and paging signal.

In the preferred embodiments of the invention, the eNB may configure zero or at least two sub-frame subsets for the UE to perform CSI measurement. For example, the eNB may basically determine two different sub-frame subsets for configuring a UE to perform CSI measurement according to a time-domain variation of a level of interference of the UE and generate one or more configuration message(s) carrying information regarding the two sub-frame subsets. The eNB may transmit the configuration message(s) to the UE, and may further receive one or more measurement result reporting message(s) carrying information regarding one or more measurement result(s) from the UE. Based on the measurement result(s), the eNB may schedule signal and/or data transmissions of the UE with the least interference.

The sub-frame in which the UE reports the measurement result(s) is called a reporting instance. The measurement result(s) may be three different reporting types of data, including Channel Quality Indicator (CQI), Pre-coding Matrix Indicator (PMI), and Rank Indicator (RI). The PMI and RI of a configured sub-frame subset are mainly obtained based on the interference measured in the sub-frames comprised in that configured sub-frame subset, and the CQI of a configured sub-frame subset is obtained based on the desired signal and interference measured in the sub-frames comprised in that configured sub-frame subset. Generally, the UE only reports one reporting type of data corresponding to one configured sub-frame subset as the measurement result in one reporting instance. In addition, the UE may be configured to periodically or aperiodically report the measurement result(s).

Collision Handling when Period Reporting

For periodic reporting, a plurality of reporting parameters, comprising at least a reporting periodicity and a reporting offset, may be configured by the eNB. The UE may determined the sub-frame index of the reporting instance based on the reporting periodicity and the reporting offset when being configured for periodic reporting measurement results. Note that because the importance of the at least two sub-frame subsets configured by the eNB for the UE to perform CSI measurement is different, according to an embodiment of the invention, it is preferably for the eNB to respectively or separately determine and configure the reporting parameters for different sub-frame subsets. For example, suppose that the reporting periodicity configured for a predetermined reporting type (such as, one of the CQI, PMI and RI) of a first sub-frame subset is 10 ms and the reporting offset configured for the predetermined reporting type of the first sub-frame subset is 2, the UE may periodically report the measurement results corresponding to the predetermined reporting type of first sub-frame subset at the $2^{nd}$, 12-th, 22-th, 32-th . . . sub-frames. In addition, suppose that the reporting periodicity configured for a predetermined reporting type of a second sub-frame subset is 5 ms and the reporting offset configured for the predetermined reporting type of the second sub-frame subset is 2, the UE may periodically report the measurement results corresponding to the predetermined reporting type of the second sub-frame subset at the $2^{nd}$, 7-th, 12-th, 17-th . . . sub-frames.

Figure 3:
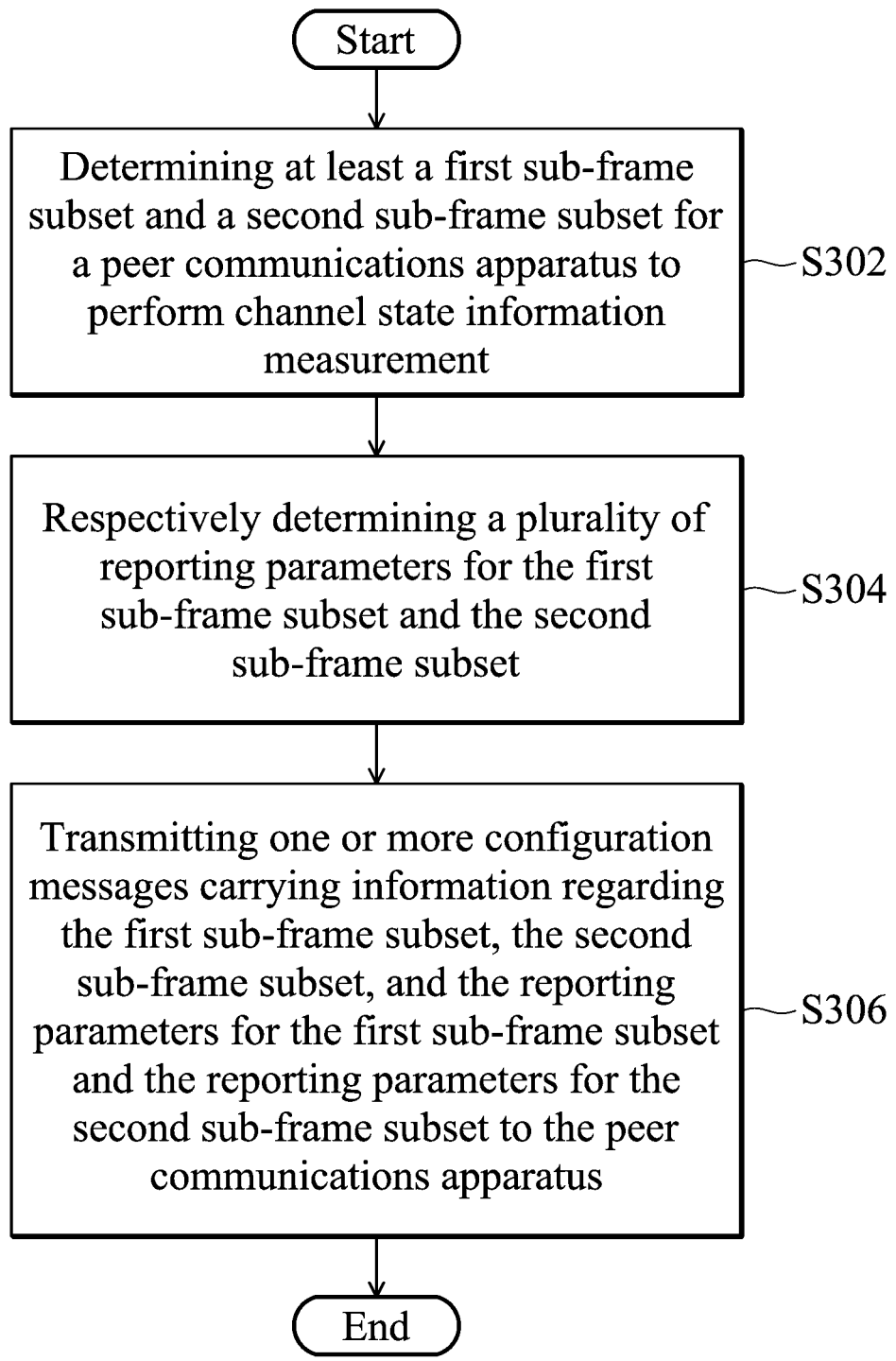
FIG. 3 is a flow chart of a method for configuring channel state information measurement in a communications system according to an embodiment of the invention.

FIG. 3 is a flow chart of a method for configuring channel state information measurement in a communications system according to an embodiment of the invention. The eNB may first determine at least a first sub-frame subset and a second sub-frame subset for a peer communications apparatus (that is, a UE) to perform channel state information measurement (Step S302). Next, the eNB may respectively determine a plurality of reporting parameters, comprising at least a reporting periodicity and a reporting offset, for the first sub-frame subset and the second sub-frame subset (Step S304). Finally, the eNB may transmit one or more configuration messages carrying information regarding the first sub-frame subset, the second sub-frame subset, and the reporting parameters for the first sub-frame subset and the reporting parameters for the second sub-frame subset to the peer communications apparatus (Step S306).

Regarding the UE (such as the communications apparatus 200 shown in FIG. 2), according to an embodiment of the invention, the processor (such as the processor 240) of the UE may comprise a plurality of processor logic units, each, designed for handling one or more tasks or functionalities. For example, in one embodiment, the processor may at least comprise a first processor logic unit for performing a channel state information measurement at the sub-frame(s) comprised in the first sub-frame subset configured by the eNB to obtain a first measurement result, a second processor logic unit for performing a second channel state information measurement at the sub-frame(s) comprised in the second sub-frame subset configured by the eNB to obtain a second measurement result, and a third processor logic unit for reporting the first measurement result and the second measurement result to the peer communications apparatus (that is, the eNB) via the transceiver 250 at one or more reporting instances. Note that as illustrated above, for periodic reporting, according to the embodiment of the invention, the reporting instances may be determined based on the reporting parameters, which are respectively or separately configured by the eNB for the first sub-frame subset and second sub-frame subset.

Because the reporting parameters of different sub-frame subsets are respectively or separately configured by the eNB for periodic reporting, collision between the reporting instances determined for different sub-frame subsets, or determined for different reporting types corresponding to the same sub-frame subset, or even determined for different reporting types corresponding to different sub-frame subsets, may occur. As the example illustrates above, a collision may occur at the $2^{nd}$, 12-th, 22-th, 32-th . . . sub-frames. To solve the collision problem, according to an embodiment of the invention, the processor may further comprise a fourth processor logic unit for determining to report which measurement result according to a priority regarding the collided measurement results.

To be more specific, according to an embodiment of the invention, for the case where collision occurs between different reporting types within the same configured sub-frame subset, the fourth processor logic unit may determine to report the measurement result according to a priority of the reporting types of the measurement results. For example, when the first measurement result obtained by the first processor logic unit for the first sub-frame subset belongs to a first reporting type and the first processor logic unit further obtains a third measurement result belonging to a second reporting type for the first sub-frame subset, and when a first reporting instance for reporting the first measurement result collides with a second reporting instance for reporting the third measurement result, the fourth processor logic unit may determine whether to report the first measurement result or the third measurement result according to a priority of the first reporting type and a priority of the second reporting type. The priorities of the reporting types may be determined as RI>wideband CQI/PMI>subband CQI, where the wideband CQI/PMI is the CQI/PMI measured over all of the frequency bands utilized by the communications system, and the subband CQI is the CQI measured on a sub-band.

According to another embodiment of the invention, for the case where collision occurs between different configured sub-frame subsets, the fourth processor logic unit may determine to report the measurement result according to priorities of the reporting types of the measurement results. For example, when the first measurement result obtained by the first processor logic unit for the first sub-frame subset belongs to a first reporting type and the second measurement result obtained by the second processor logic unit for the second sub-frame subset belongs to a second reporting type, the fourth processor logic unit may determine whether to report the first measurement result or the second measurement result according to a priority of the first reporting type and a priority of the second reporting type when a first reporting instance for reporting the first measurement result collides with a second reporting instance for reporting the second measurement result.

According to yet another embodiment of the invention, for the case where collision occurs between different configured sub-frame subsets, the fourth processor logic unit may determine to report which measurement result according to priorities of the configured sub-frame subsets. For example, the fourth processor logic unit may determine whether to report the first measurement result or the second measurement result according to a priority of the first sub-frame subset and a priority of the second sub-frame subset when a first reporting instance for reporting the first measurement result collides with a second reporting instance for reporting the second measurement result. As previously described, because the importance of the at least two sub-frame subsets configured by the eNB for the UE to perform CSI measurement is different, the priorities of the configured sub-frame subsets may be determined according to the importance thereof. When collision occurs, the measurement result for a more important sub-frame subset may be reported.

According to still another embodiment of the invention, for the case where collision occurs between different configured sub-frame subsets and different report types, the fourth processor logic unit may determine to report which measurement result according to priorities of the different configured sub-frame subsets and priorities of the reporting types corresponding to the measurement results. In the embodiment, the priorities of the reporting types may precede the priorities of the sub-frame subsets. For example, among the collided measurement results, the fourth processor logic unit may choose the measurement result(s) having the highest priority of reporting type. If two measurement results are chosen, the fourth processor logic unit may then select the one with highest priority in the configured sub-frame subset.

Alternatively, according to still another embodiment of the invention, the priorities of the sub-frame subsets may precede the priorities of the reporting types. For example, among the collided measurement results, the fourth processor logic unit may choose the measurement result(s) having the highest priority of the configured sub-frame subset. If multiple measurement results are chosen, the fourth processor logic unit may then select the one with the highest priority in reporting type.

According to the embodiments of the invention, no matter when the measurement result reporting message(s) is/are transmitted on a control channel (such as a physical uplink control channel (PUCCH)) or a data channel (such as a physical uplink shared channel (PUSCH)), the collision handling mechanisms proposed for handling collisions in periodic reporting as described above may all be applied. In addition, in still some embodiments of the invention, where collision occurs between different reporting types within the same configured sub-frame subset, the fourth processor logic unit may determine to report the measurement result on the control channel according to the collision handling mechanisms as described above, and where collision occurs between different configured sub-frame subsets, the fourth processor logic unit may determine to report all of the collided measurement results on the data channel, because the amount of data which can be transmitted on a control channel is fewer than that on a data channel.

Alternatively, in still some other embodiments of the invention, where collision occurs between different reporting types within the same configured sub-frame subset, the fourth processor logic unit may determine to report all of the collided measurement results on the data channel, and where collision occurs between different configured sub-frame subsets, the fourth processor logic unit may determine to report the measurement result on the control channel according to the collision handling mechanisms as described above. Furthermore, in still some other embodiments of the invention, the fourth processor logic unit may determine to report all of the collided measurement results on the data channel, no matter whether the collision occurs between different reporting types or between different configured sub-frame subsets.

Determination of the CQI Reference Resource

As mentioned above, the CQI of a configured sub-frame subset is obtained based on the desired signal and interference measured in the sub-frames comprised in that configured sub-frame subset. Therefore, for periodic reporting of CQI, after obtaining information regarding the configured sub-frame subsets and the corresponding reporting parameters, the UE (to be more specific, at least a processor logic unit of the processor comprised in the UE) may determine at least a measuring instance for measuring the power of a desired signal of a configured sub-frame subset based on the reporting instance linked to that configured sub-frame subset, where the reporting instance is determined according to the reporting parameters of the configured sub-frame subset and the measuring instance is a sub-frame in which the desired signal to be measured. Note that the measuring instance may also be named as a "CQI reference resource" or a "CSI reference resource".

Figure 4:
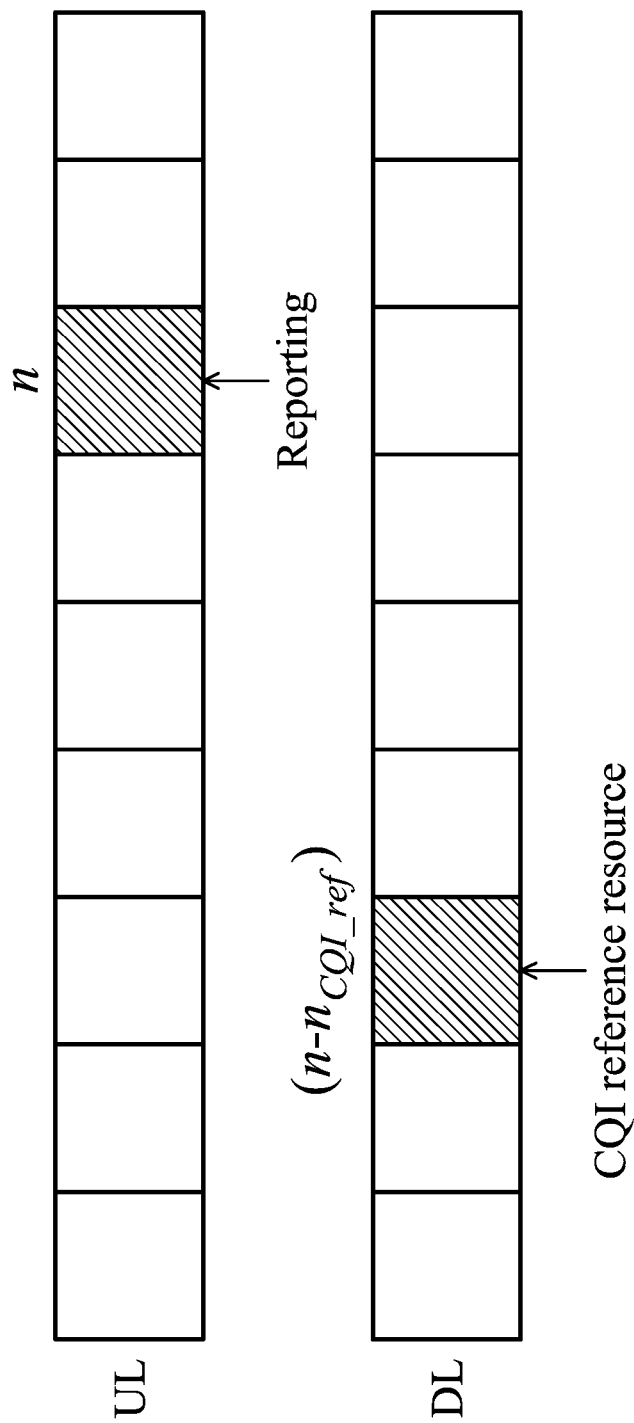
FIG. 4 is a diagram showing the concept of determining a position of the CQI reference resource according to an embodiment of the invention.

FIG. 4 is a diagram showing the concept of determining a position of the CQI reference resource according to an embodiment of the invention. For a CQI value of a configured sub-frame subset reported in the uplink sub-frame n, the CQI reference resource in the time domain is defined as a single downlink sub-frame (n-$n_{CQI\_ref}$). To be more specific, as previously described, the UE may determine the sub-frame index of the reporting instance based on the reporting periodicity and the reporting offset configured by the eNB for periodic reporting. Suppose that the determined sub-frame index of a reporting instance is n, the UE may further determine the position (i.e. sub-frame index) of the CQI reference resource as (n-$n_{CQI\_ref}$). According to an embodiment of the invention, the definition of $n_{CQI\_ref}$ for periodic reporting may be determined according to the following rule:

$n_{CQI\_ref}$ is a smallest integer greater than or equal to 4, such that the sub-frame (n-$n_{CQI\_ref}$) is a valid downlink sub-frame and belongs to a configured sub-frame subset, where the reporting instance n is explicitly linked to that configured reporting instance.

Take the embodiment shown in FIG. 4 as an example, when a fifth processor logic unit of the processor comprised in the UE is arranged to determine a position of the CQI reference resource (that is, the measuring instance) for the first sub-frame subset, the fifth processor logic unit may start backward from the sub-frame (n-4), then the sub-frames (n-5), (n-6) . . . and so on, so as to find a first sub-frame that is a valid downlink sub-frame belonging to the first sub-frame subset. Therefore, a difference between sub-frame indexes of the reporting instance and the measuring instance is a smallest integer greater than or equal to a predetermined value (that is, in this example, 4), such that the measuring instance is a valid downlink sub-frame and is one of a plurality of sub-frames comprised in the first sub-frame subset. Note that in the embodiments, a maximum value of $n_{CQI\_ref}$ ref may be defined, so that the measured CQI value is not out of date.

Figure 5:
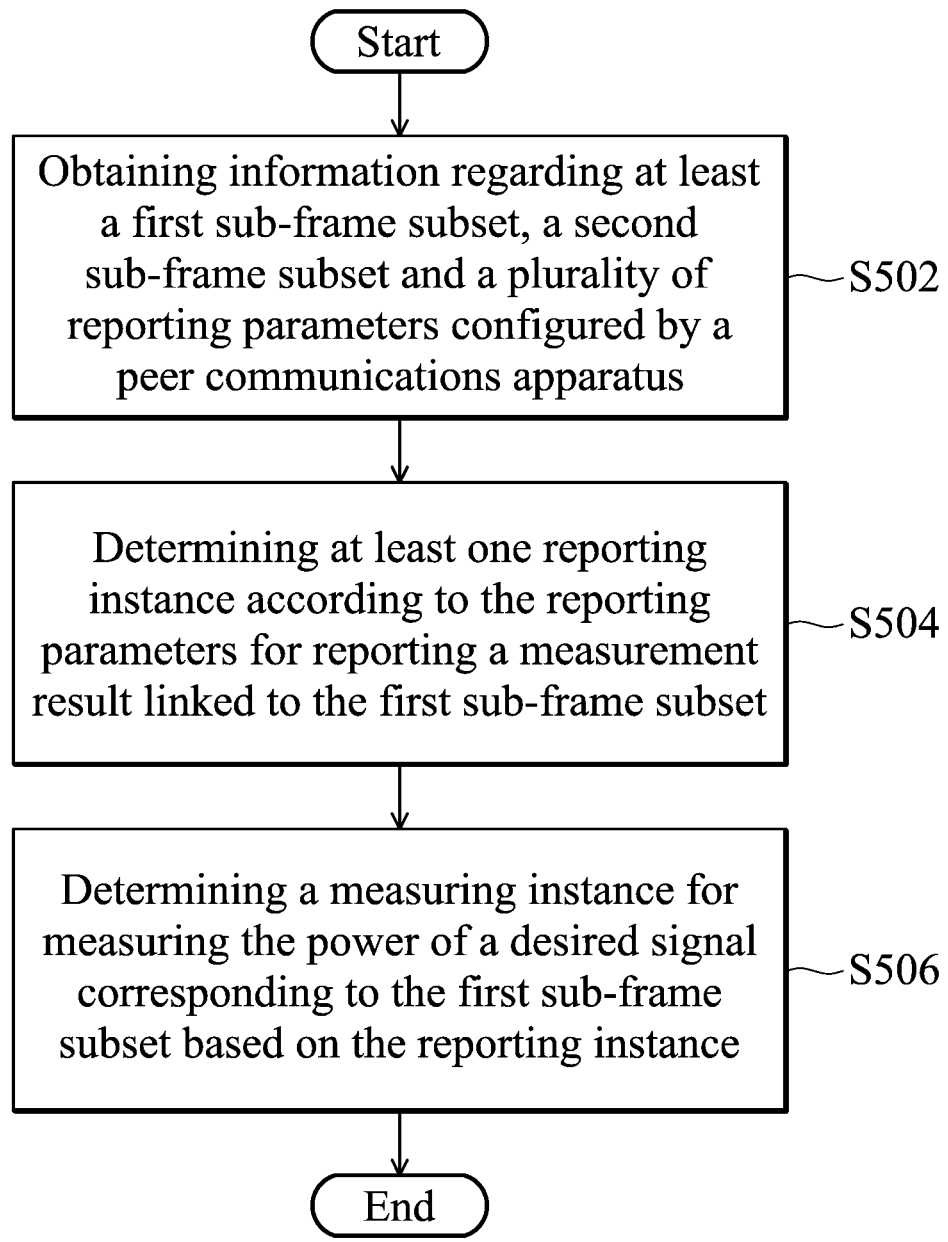
FIG. 5 is a flow chart of a method for determining a measuring instance for performing a channel state information measurement in a communications system according to an embodiment of the invention.

FIG. 5 is a flow chart of a method for determining a measuring instance for performing a channel state information measurement in a communications system according to an embodiment of the invention. The UE may first obtain information regarding at least a first sub-frame subset, a second sub-frame subset and a plurality of reporting parameters configured by a peer communications apparatus (that is, the eNB) (Step S502), where the first and second sub-frame subsets are configured for performing a channel state information measurement and the reporting parameters correspond to at least the first sub-frame subset. Next, the UE may determine at least one reporting instance according to the reporting parameters for reporting a measurement result linked to the first sub-frame subset (Step S504). Finally, the UE may determine a measuring instance for measuring the power of a desired signal corresponding to the first sub-frame subset based on the reporting instance (Step S506), such that the measuring instance is a valid downlink sub-frame belonging to the first sub-frame subset.

Figure 6:
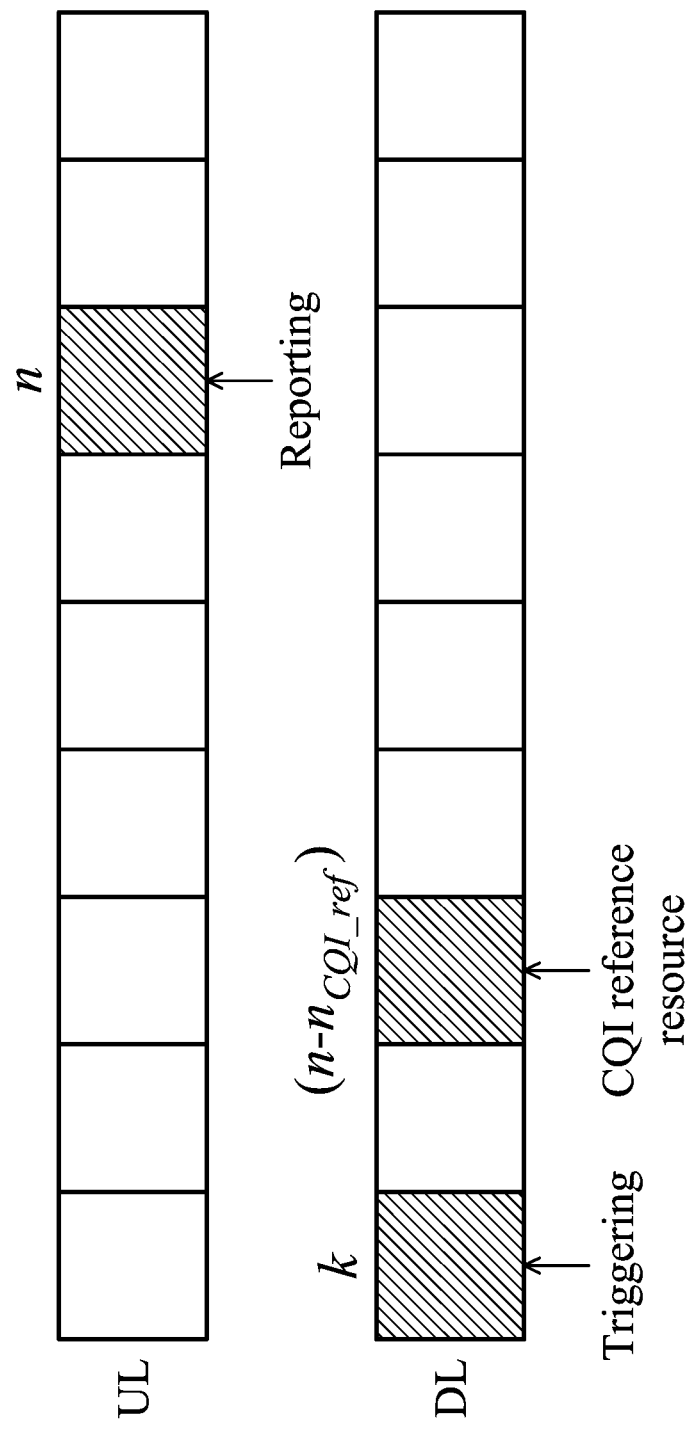
FIG. 6 is a diagram showing the concept of determining a position of the CQI reference resource according to another embodiment of the invention.

On the other hand, for aperiodic reporting of CQI, because the UE may report the measurement result(s) only when being triggered by the eNB, the method for determining a position of the CQI reference resource may be different from the periodic reporting case. FIG. 6 is a diagram showing the concept of determining a position of the CQI reference resource according to another embodiment of the invention. After receiving a triggering message from the eNB in sub-frame k, the UE may know that it has to report the measurement result in sub-frame n. Note that the eNB may transmit the triggering message by various ways. For example, the eNB may transmit the triggering message by transmitting a uplink downlink control information (DCI) format signal, a random access response grant signal, or others. The UE may further determine the position (i.e. sub-frame index) of the CQI reference resource as (n-$n_{CQI\_ref}$). According to an embodiment of the invention, the definition of $n_{CQI\_ref}$ for periodic reporting may be determined according to the following rule:

when the reporting is triggered by an uplink DCI format signal, $n_{CQI\_ref}$ is selected as a number such that the CQI reference resource is the same valid downlink sub-frame as the corresponding CQI request (that is, the triggering sub-frame k) if that valid downlink sub-frame is contained in at least one configured sub-frame subset.

when the reporting is triggered by a random access response grant signal, $n_{CQI\_ref}$ ref is equal to 4 if the downlink sub-frame (n-4) corresponds to a valid downlink sub-frame contained in at least one configured sub-frame subset, where the downlink sub-frame (n-4) is received after the sub-frame with the corresponding CQI request (that is, the triggering sub-frame k).

However, because patterns of the sub-frame subsets are usually quite different, when that valid downlink sub-frame (that is, the triggering sub-frame k for when being triggered by an uplink DCI format signal, or the sub-frame (n-4) when being triggered by a random access response grant signal) is not contained in any configured sub-frame subset, or is a common sub-frame that is contained in both the configured sub-frame subsets, the UE has to further determine which sub-frame subset is to be measured before performing CSI measurement. Take the embodiment shown in FIG. 6 as an example, similar to the periodic CQI reporting case, the processor logic unit may start backward from the sub-frame k or (n-4), then the sub-frames (k-1) or (n-5) . . . and so on, so as to find a first sub-frame that is a valid downlink sub-frame belonging to the determined sub-frame subset.

To be more specific, according to an embodiment of the invention, for aperiodic reporting, the UE may first obtain information regarding at least a first sub-frame subset and a second sub-frame subset configured by a peer communications apparatus (that is, the eNB), receive a triggering message from the peer communications apparatus, and then determine a reporting instance for reporting a measurement result in response to the triggering message. Next, the UE may further determine a sub-frame subset to be measured from the first and second sub-frame subsets according to a predetermined rule when the triggering message is unable to be linked to any of the first sub-frame subset and the second sub-frame subset or when the triggering message links to both of the first sub-frame subset and the second sub-frame subset, and determine a measuring instance for measuring the power of a desired signal corresponding to the determined sub-frame subset. Note that based on the concept of the invention, the measuring instance determined by the UE should be a valid downlink sub-frame and belong to the determined sub-frame subset.

According to an embodiment of the invention, the predetermined rule for obtaining the determined sub-frame subset may be designed as to predefine one of the first and second sub-frame subsets as the determined sub-frame subset. In other words, every time when the triggering message is unable to be linked to any of the first sub-frame subset and the second sub-frame subset or when the triggering message links to both of the first sub-frame subset and the second sub-frame subset, the UE may always select a fixed sub-frame subset to be measured.

According to another embodiment of the invention, the predetermined rule may be designed to select one of the first and second sub-frame subsets as the determined sub-frame subset according to at least a frame index and a sub-frame index of the reporting instance. In other words, the UE may use the frame index and the sub-frame index of the reporting instance, or use other parameter(s) to perform a calculation, so as to obtain a calculation result indicating which sub-frame subset is to be measured.

According to yet another embodiment of the invention, the predetermined rule may be designed to select an alternative sub-frame subset which was adopted in the most recent periodic reporting instance as the determined sub-frame subset. According to still another embodiment of the invention, the predetermined rule may be designed to select an alternative sub-frame subset which was adopted in the most recent aperiodic reporting instance as the determined sub-frame subset. According to still another embodiment of the invention, the predetermined rule may be designed to select the sub-frame subset adopted in the most recent periodic reporting instance as the determined sub-frame subset. According to still another embodiment of the invention, the predetermined rule may be designed to select the sub-frame subset adopted in the most recent aperiodic reporting instance as the determined sub-frame subset. Note that in the above-mentioned embodiments, a maximum value of $n_{CQI\_ref}$ may be defined, so that the CQI reference resource $(n-n_{CQI\_ref})$ is not out of date.

According to still another embodiment of the invention, the UE may directly determine to skip this reporting instance when the triggering message is unable to be linked to any of the first sub-frame subset and the second sub-frame subset or when the triggering message links to both of the first sub-frame subset and the second sub-frame subset. That is, the UE does not need to determine which sub-frame subset is to be measured. In this case, none of the first and second sub-frame subsets would be determined, and the determination of the measuring position instance may be skipped, too.

Enhancement in CSI Measurement

Although the embodiments described above configure two sub-frame subsets for CSI measurement, the invention should not be limited thereto. For example, the eNB may further configure a third sub-frame subset for performing CSI measurement, so as to enhance the result of CSI measurement, and may carry information regarding the third sub-frame subset in one or more configuration messages to be transmitted to the UE. In the embodiments of the invention, the third sub-frame subset may comprise a subset of sub-frames that are not comprised in the first and second sub-frame subsets. Therefore, in some embodiments of the invention, the UE may further obtain information regarding the third sub-frame subset configured by the eNB, obtain information regarding the reporting parameters of the third sub-frame subset (when being configured as periodic reporting) from the eNB, or receive a triggering message for triggering the reporting of the measurement result corresponding to the third sub-frame subset (when being configured as aperiodic reporting) from the eNB, as previously described, or others.

When collision occurs in the reporting instances between the three configured sub-frame sub-sets for periodic reporting, the UE may determine to report the measurement result corresponding to the first, second or third sub-frame subsets according to a priority of the first measurement result, a priority of the second measurement result and/or a priority of the third measurement result, or a priority of the first sub-frame subset, a priority of the second sub-frame subset and/or a priority of the third sub-frame subset, or any combinations thereof. The collision handling mechanisms proposed for handling collisions in periodic reporting as described above may all be applied when collision occurs between the three configured sub-frame sub-sets. Therefore, details of illustrations are omitted here for brevity.

In addition, concepts of determination of the CQI reference resource in the periodic or aperiodic reporting cases as described above may all be applied when three sub-frame sub-sets are configured by the eNB. For the aperiodic reporting of CQI, the UE may determine which sub-frame subset is to be measured from the first, second and third sub-frame subsets according to the predetermined rule as described above when the triggering message is unable to be linked to any of the first sub-frame subset, the second sub-frame subset and the third sub-frame subset.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
  a processor; and
  a transceiver, for receiving one or more configuration messages carrying information regarding to a first sub-frame subset, a second sub-frame subset and a plurality of reporting parameters from a peer communications apparatus,
  wherein the processor at least comprises:
  a first processor logic unit for performing a channel state information measurement at the sub-frame(s) comprised in the first sub-frame subset configured by the peer communications apparatus to obtain a first measurement result;
  a second processor logic unit for performing a second channel state information measurement at the sub-frame(s) comprised in the second sub-frame subset configured by the peer communications apparatus to obtain a second measurement result; and
  a third processor logic unit for reporting the first measurement result and the second measurement result to the peer communications apparatus via the transceiver at one or more reporting instances, and,
  wherein the reporting instances are determined based on the reporting parameters;
  wherein the processor further comprises a fourth processor logic unit for determining whether to report at least one of the first and second measurement result according to a priority of the first measurement result, a priority of the second measurement result, a priority of at least one of the first sub-frame subset, and a priority of the second sub-frame subset when a first reporting instance for reporting the first measurement result collides with a second reporting instance for reporting the second measurement result.

2. The communications apparatus as claimed in claim 1, wherein the first measurement result obtained by the first processor logic unit for the first sub-frame subset belongs to a first reporting type, and the first processor logic unit further obtains a third measurement result belonging to a second reporting type for the first sub-frame subset, and the processor further comprises a fourth processor logic unit for determining whether to report the first measurement result or the third measurement result according to a priority of the first reporting type and a priority of the second reporting type when a first reporting instance for reporting the first measurement result collides with a second reporting instance for reporting the third measurement result.

3. The communications apparatus as claimed in claim 1, wherein the first measurement result obtained by the first processor logic unit for the first sub-frame subset belongs to a first reporting type, the second measurement result obtained by the second processor logic unit for the second sub-frame subset belongs to a second reporting type, and the processor further comprises a fourth processor logic unit for determining whether to report the first measurement result or the second measurement result according to a priority of the first reporting type and a priority of the second reporting type when a first reporting instance for reporting the first measurement result collides with a second reporting instance for reporting the second measurement result.

4. The communications apparatus as claimed in claim 1, wherein the first processor logic unit further obtains a third measurement result for the first sub-frame subset, and the processor further comprises a fourth processor logic unit for determining whether to report the first, second, or third measurement result according to priorities of the first and second sub-frame subsets and priorities of a reporting type of the first, second and third measurement results, wherein the priorities of the reporting types precede the priorities of the sub-frame subsets.

5. The communications apparatus as claimed in claim 1, wherein the first processor logic unit further obtains a third measurement result for the first sub-frame subset, and the processor further comprises a fourth processor logic unit for determining whether to report the first, second, or third measurement result according to priorities of the first and second sub-frame subsets and priorities of a reporting type of the first, second and third measurement results, wherein the priorities of the sub-frame subsets precede the priorities of the reporting types.

6. The communications apparatus as claimed in claim 1, wherein the first processor logic unit further obtains a third measurement result for the first sub-frame subset, and when a first reporting instance for reporting the first measurement result collides with a second reporting instance for reporting the third measurement result, the third processor logic unit reports both of the first and the third measurement results on a data channel instead of a control channel.

7. The communications apparatus as claimed in claim 1, wherein when a first reporting instance for reporting the first measurement result collides with a second reporting instance for reporting the second measurement result, the third processor logic unit reports both of the first and the second measurement results on a data channel instead of a control channel.

8. The communications apparatus as claimed in claim 1, wherein the processor further comprises a fifth processor logic unit for performing a third channel state information measurement at the sub-frame(s) comprised in a third sub-frame subset configured by the peer communications apparatus to obtain a third measurement result, wherein the third sub-frame subset comprises a subset of sub-frames that are not comprised in the first and second sub-frame subsets.

9. The communications apparatus as claimed in claim 8, wherein the fourth processor logic unit determines whether to report the first, second or third measurement result according to a priority of the first measurement result, a priority of the second measurement result and/or a priority of the third measurement result, or a priority of the first sub-frame subset, a priority of the second sub-frame subset and/or a priority of the third sub-frame subset when a first reporting instance for reporting the first measurement result collides with a second reporting instance for reporting the second measurement result and/or a third reporting instance for reporting the third measurement result.

10. A method for configuring channel state information measurement in a communications system, comprising:
   determining at least a first sub-frame subset and a second sub-frame subset for a peer communications apparatus to perform channel state information measurement;
   respectively determining a plurality of reporting parameters comprising at least a reporting periodicity and a reporting offset for the first sub-frame subset and the second sub-frame subset; and
   transmitting one or more configuration messages carrying information regarding the first sub-frame subset, the second sub-frame subset, and the reporting parameters for the first sub-frame subset and the reporting parameters for the second sub-frame subset to the peer communications apparatus.

11. The method as claimed in claim 10, further comprising:
   determining a third sub-frame subset for the peer communications apparatus to perform channel state information measurement, wherein the third sub-frame subset comprises a subset of sub-frames that are not comprised in the first and second sub-frame subsets; and
   carrying information regarding the third sub-frame subset in the one or more configuration messages to be transmitted to the peer communications apparatus.

12. A communications apparatus, comprising:
   a processor, coupled to a transceiver; and
   a transceiver, for receiving one or more configuration messages carrying information regarding to a first sub-frame subset, a second subset and a plurality of reporting parameters from a peer communications apparatus,
   wherein the processor at least comprises:
   a first processor logic unit for obtaining the information regarding at least a the first sub-frame subset, a the second sub-frame subset and a plurality of the reporting parameters configured by a the peer communications apparatus, wherein the first and second sub-frame subsets are configured for performing a channel state information measurement via the transceiver and the reporting parameters correspond to at least the first sub-frame subset;
   a second processor logic unit for determining at least one reporting instance according to the reporting parameters for reporting a measurement result linked to the first sub-frame subset; and a third processor logic unit for determining a measuring instance for measuring the power of a desired signal corresponding to the first sub-frame subset based on the reporting instance, wherein the measuring instance is a valid downlink sub-frame belonging to the first sub-frame subset.

13. The communications apparatus as claimed in claim 12, wherein a difference between sub-frame indexes of the reporting instance and the measuring instance is a smallest integer greater than or equal to a predetermined value such that the measuring instance is a valid downlink sub-frame and is one of a plurality of sub-frames comprised in the first sub-frame subset.

14. A method for determining an instance for performing a channel state information measurement in a communications system, comprising:
receiving one or more configuration messages carrying information regarding a first sub-frame subset, a second sub-frame subset and a plurality of reporting parameters from a peer communications apparatus;
obtaining the information regarding the first sub-frame subset the second sub-frame subset and the reporting parameters configured by the peer communications apparatus, wherein the first and second sub-frame subsets are configured for performing a channel state information measurement and the reporting parameters correspond to at least the first sub-frame subset;
determining at least one reporting instance according to the reporting parameters for reporting a measurement result linked to the first sub-frame subset; and
determining a measuring instance for measuring the power of a desired signal corresponding to the first sub-frame subset based on the reporting instance, wherein the measuring instance is a valid downlink sub-frame belonging to the first sub-frame subset.

15. The method as claimed in claim 14, wherein a difference between sub-frame indexes of the reporting instance and the measuring instance is a smallest integer greater than or equal to a predetermined value such that the measuring instance is a valid downlink sub-frame and is one of a plurality of sub-frames comprised in the first sub-frame subset.

16. A communications apparatus, comprising:
a processor; and
a transceiver, for receiving one or more configuration messages carrying information regarding to a first sub-frame subset, a second subset and a plurality of reporting parameters from a peer communications apparatus,
wherein the processor at least comprises:
a first processor logic unit for obtaining the information regarding the first sub-frame subset and the second sub-frame subset configured by the peer communications apparatus, wherein the first and second sub-frame subsets are configured for performing a channel state information measurement via the transceiver;
a second processor logic unit for determining a reporting instance for reporting a measurement result in response to a triggering message received from the peer communications apparatus for triggering a measurement report;
a third processor logic unit for determining a sub-frame subset to be measured from the first and second sub-frame subsets according to a predetermined rule when the triggering message is unable to be linked to any of the first sub-frame subset and the second sub-frame subset or when the triggering message links to both of the first sub-frame subset and the second sub-frame subset; and
a fourth processor logic unit for determining a measuring instance for measuring the power of a desired signal corresponding to the determined sub-frame subset, wherein the measuring instance is a valid downlink sub-frame belonging to the determined sub-frame subset.

17. The communications apparatus as claimed in claim 16, wherein the predetermined rule is to determine that none of the first and second sub-frame subsets are to be measured, wherein the third processor logic further instructs the fourth processor logic unit to skip the determination of the measuring instance.

18. The communications apparatus as claimed in claim 16, wherein the predetermined rule is to predefine one of the first and second sub-frame subsets as the determined sub-frame subset.

19. The communications apparatus as claimed in claim 16, wherein the predetermined rule is to select one of the first and second sub-frame subsets as the determined sub-frame subset according to at least a frame index and a sub-frame index of the reporting instance.

20. The communications apparatus as claimed in claim 16, wherein the predetermined rule is to select an alternative sub-frame subset which was adopted in the most recent periodic reporting instance as the determined sub-frame subset.

21. The communications apparatus as claimed in claim 16, wherein the predetermined rule is to select an alternative sub-frame subset which was adopted in the most recent aperiodic reporting instance as the determined sub-frame subset.

22. The communications apparatus as claimed in claim 16, wherein the predetermined rule is to select the sub-frame subset adopted in the most recent periodic reporting instance as the determined sub-frame subset.

23. The communications apparatus as claimed in claim 16, wherein the predetermined rule is to select the sub-frame subset adopted in the most recent aperiodic reporting instance as the determined sub-frame subset.

24. The communications apparatus as claimed in claim 16, wherein the first processor logic unit further obtains information regarding a third sub-frame subset configured by the peer communications apparatus for performing the channel state information measurement and the third processor logic unit further determines the sub-frame subset to be measured from the first, second and third sub-frame subsets according to the predetermined rule when the triggering message is unable to be linked to any of the first sub-frame subset, the second sub-frame subset or the third sub-frame subset.

25. The communications apparatus as claimed in claim 24, wherein the third sub-frame subset comprises a subset of sub-frames that are not comprised in the first and second sub-frame subsets.

* * * * *